3,356,571
POTENTIATION OF TETRACYCLINE BY POLYACRYLIC ACID OR HYDROLYZED POLYACRYLONITRILE
Edward Takesue, Mendham, N.J., Joseph John Hlavka, Tuxedo, N.Y., and James Howard Boothe, Montvale, N.J., assignors to American Cyanamid Company, Stamford, Conn., a corporation of Maine
No Drawing. Filed Nov. 25, 1964, Ser. No. 413,978
16 Claims. (Cl. 167—65)

This application is a continuation-in-part of our copending application Serial No. 77,006, filed Dec. 12, 1960, now United States Patent No. 3,159,537, which, in turn, is a continuation-in-part of our copending application Serial No. 826,110, filed July 10, 1959, now abandoned.

This invention is concerned with improved compositions containing tetracycline antibiotics and polyacrylic acids which serve to promote absorption under physiological conditions thus resulting in higher blood concentrations of antibiotic.

The use of the tetracycline antibiotics administered orally presents some problems where it is desired to have the antibiotic penetrate the blood stream, as in many cases there is considerable loss through poor absorption of antibiotic and thus only a portion appears in the blood.

In the past, various attempts have been made to increase the blood levels obtained by oral feeding of tetracycline antibiotics with various substances which have been generally referred to in the art as adjuvants. Typical of such substances are citric acid and its salts; various chelating agents, such as salts of ethylenediamine tetraacetic acid; various inorganic phosphates, and the like. Recently, terephthalic acid has been proposed as an adjuvant, more particularly when tetracyclines are incorporated in animal feeds, and glucosamine has been proposed for human use.

According to the present invention, we have found that certain polyacrylic acids serve to promote greater absorption of the antibiotic into the blood stream and exert a more powerful adjuvant action or potentiating effect than those which have been used heretofore.

More particularly, we contemplate as novel adjuvants polyacrylic acids having molecular weights from about 10,000 to 500,000 as well as similar substances known as hydrolyzed polyacrylonitriles.

The compositions of the present invention include any of the tetracycline antibiotics, including tetracycline itself (abbreviated TC) and its salts, such as tetracycline hydrochloride (abbreviated TC.HCl); chlortetracycline (abbreviated CTC) and its salts, such as the hydrochloride; oxytetracycline (abbreviated OTC); demethylchlortetracycline (abbreviated DMCTC); demethyltetracycline (abbreviated DMTC) and various derivatives such as the following tetracycline compounds:

6-deoxytetracycline; 6-demethyl-6-deoxytetracycline,
7-bromo-6-demethyl-6-deoxytetracycline,
7-chloro-6-demethyl-6-deoxytetracycline,
7-iodo-6-demethyl-6-deoxytetracycline,
7-nitro-6-demethyl-6-deoxytetracycline,
9-nitro-6-demethyl-6-deoxytetracycline,
7-bromo-6-deoxytetracycline,
7-iodo-6-deoxytetracycline,
9-nitro-6-deoxytetracycline,
7-nitro-6-deoxytetracycline,
7-amino-6-demethyl-6-deoxytetracycline,
9-amino-6-demethyl-6-deoxytetracycline,
9-amino-6-deoxytetracycline,
9-amino-7-bromo-6-deoxytetracycline,
9-amino-7-nitro-6-deoxytetracycline,
7-iodo-5-hydroxy-6-deoxytetracycline,
7-bromo-5-hydroxy-6-deoxytetracycline,
5-hydroxy-6-deoxytetracycline,
9-amino-7-bromo-6-demethyl-6-deoxytetracycline,
7-bromo-9-nitro-6-demethyl-6-deoxytetracycline,
9-amino-7-chloro-6-demethyl-6-deoxytetracycline,
7-chloro-9-nitro-6-demethyl-6-deoxytetracycline, and
7-methylamino-6-deoxy-6-demethyltetracycline.

The expression "tetracycline antibiotic" as used throughout the specification and claims is intended to embrace any of the foregoing tetracycline compounds. It is to be understood that those tetracyclines which are commercial or potentially commercial drugs such as chlortetracycline, tetracycline, oxytetracycline, demethylchlortetracycline and demethyltetracycline are especially preferred because of their ready availability and demonstrated clinical usefulness.

The method of administering the compositions of the present invention to mammals is quite varied. Aqueous solutions may be employed and this modification includes the addition of the compositions of the present invention to water in the case of animals which obtain their water from a central source. The mixture of the two substances as a suspension or dispersion in highly flavored extracts or in solid form is also useful. Solutions for intravenous or solutions or suspensions for intramuscular administrations are possible. For example, the adjuvant and the tetracycline antibiotic with an inert excipient may be enclosed in hard- or soft-shell gelatin capsules or they may be compressed into tablets or incorporated with animal feeds. In general, the method of administering the compositions of the present invention does not depart from the conventional means of administering tetracycline antibiotics. This is an advantage of the present invention and the improved results are obtained without requiring a special technique of administration.

The proportion of tetracycline antibiotic to adjuvant may vary over fairly wide limits. Preferably the adjuvant is present in amounts ranging from 0.1 to 10 parts by weight, with optimum results being obtained in amounts of from 0.1 to 3 parts by weight.

A dosage unit form for oral administration to humans is most conveniently a powdered mixture of the antibiotic and the adjuvant enclosed in a gelatin capsule. A dosage unit form may contain from about 25 to 500 mg. of one of the desired tetracyclines with from 0.1 to 3 parts by weight or more of adjuvant. An inert diluent such as starch, sucrose, or magnesium stearate may be added if desired. A preferred composition consists of 150–250 mg. of a tetracycline antibiotic together with 100–500 mg. of an adjuvant in a soft gelatin capsule. If desired, the compositions may be granulated and administered as such, or may be compressed into tablets suitable for oral administration. Also, if desired, a composition can be formulated into numerous pharmaceutical substances such as pediatric drops, ilixirs, and various other conventional pharamceutical forms of medication. These will be administered by the attending physician or veterinarian in accordance with the age and condition of the patient, nature of the disease and in view of the other considerations peculiar to the individual patient.

In the following examples, different controls are used in each case because comparison techniques for tetracycline antibiotics are considered most accurate when given in the same period. This standard procedure is followed in the examples and explains why there will be a variation in blood levels of animals used in control experiments. In each example, the important thing is not the absolute numerical value of the blood level, but the value of the blood level relative to the control in the particular example. In the examples, the abbreviations for the various tetracycline antibiotics set out above will be used to facilitate ease of understanding and the adjuvants will be abbreviated "Adj" followed by the number of the adjuvant substance.

The invention will be described in greater detail in conjunction with the following specific examples.

EXAMPLE 1

Groups of the same number of albino rats, ranging in weight from 175 to 300 grams, were dosed orally with a solution or suspension of 50 mg./kg. of tetracycline hydrochloride via a feeding needle. Similar groups received a mixture of 50 mg./kg. of TC·HCl plus 140 mg./kg. of known adjuvants. The serum levels obtained four hours following administration are shown in the following table:

TABLE I

| Substance | Dose | Serum levels, mcg./ml. |
|---|---|---|
| TC·HCl | 50 mg./kg. | 4.98 |
| TC·HCl plus terephthalic acid | 50 mg./kg.+140 mg./kg. | 5.37 |
| TC·HCl plus citric acid | 50 mg./kg.+140 mg./kg. | 7.18 |
| TC·HCl plus glucosamine | 50 mg./kg.+140 mg./kg. | 4.49 |

It will be noted that citric acid and terephthalic acid result in substantial increase in serum level but glucosamine, which has been used extensively does not result in any significant difference.

EXAMPLE 2

The procedure of Example 1 was repeated using 50 milligrams of tetracycline hydrochloride per kilogram of body weight as the control and 50 milligrams of the listed polyacrylic acids per kilogram of body weight. The results obtained are shown in the table below:

TABLE II

| Substance | Serum levels, mcg./ml. | Mcg./ml. of TC·HCl on same test |
|---|---|---|
| TC·HCl plus polyacrylic acid, M.W. 10,000 | 6.32 | 3.56 |
| TC·HCl plus polyacrylic acid, M.W. 50,000 | 5.75 | 3.56 |
| TC·HCl plus polyacrylic acid, M.W. 100,000 | 5.85 | 3.56 |
| TC·HCl plus polyacrylic acid, M.W. 250,000 | 6.89 | 3.56 |
| TC·HCl plus hydrolyzed polyacrylonitrile | 6.50 | 4.62 |

EXAMPLE 3

Tetracycline and demethyltetracycline were administered by stomach tube alone and in combination with one of the polyacrylic acids. The rats were dosed first with 50 mg./kg. of antibiotic followed by 50 mg./kg. of adjuvant at a volume of 1 ml./100 g. body weight. Each combination was tested in five rats and the experiment repeated to have a total of ten rats. Tail blood of warmed rats was collected at 2 and 4 hours after dosing. The serum level obtained are shown in the following table:

TABLE III.—AVERAGE ANTIBIOTIC SERUM LEVELS IN RATS FOLLOWING ORAL DOSING OF TETRACYCLINE OR DEMETHYLTETRACYCLINE WITH OR WITHOUT ADJUVANTS

| Compound [1] | Adjuvant | M.W. | Serum Antibiotic Activity [2] (mcg./ml.) | | |
|---|---|---|---|---|---|
| | | | 2 hrs. | 4 hrs. | Avg. |
| Tetracycline | | | 6.00 | 4.38 | 5.19 |
| Do | Polyacrylic acid | 10,000 | 9.08 | 8.04 | 8.56 |
| Do | do | 50,000 | 10.60 | 8.99 | 9.80 |
| Do | do | 150,000 | 10.58 | 8.47 | 9.53 |
| Do | do | 500,000 | 12.03 | 9.22 | 10.63 |
| Demethyltetracycline | | | 4.99 | 3.08 | 4.04 |
| Do | Polyacrylic acid | 10,000 | 8.41 | 6.74 | 7.57 |
| Do | do | 50,000 | 9.00 | 6.61 | 7.81 |
| Do | do | 150,000 | 8.53 | 6.44 | 7.49 |
| Do | do | 500,000 | 9.53 | 7.18 | 8.27 |

[1] Dose was 50 mg./kg. of antibiotic or adjuvant.
[2] Average of ten rats.

We claim:
1. A composition of matter for oral use comprising a tetracycline antibiotic and as an oral potentiating agent therefor from 0.1 to 10 parts by weight of polyacrylic acid having a molecular weight of from about 10,000 to about 500,000.

2. A composition of matter according to claim 1 in which the tetracycline antibiotic is tetracycline.

3. A composition of matter according to claim 1 in which the tetracycline antibiotic is demethylchlortetracycline.

4. A composition of matter according to claim 1 in which the tetracycline antibiotic is demethyltetracycline.

5. A composition of matter for oral use comprising a tetracycline antibiotic and as an oral potentiating agent therefor from 0.1 to 10 parts by weight of hydrolyzed polyacrylonitrile.

6. A composition of matter according to claim 5 in which the tetracycline antibiotic is tetracycline.

7. A composition of matter according to claim 5 in which the tetracycline antibiotic is demethylchlortetracycline.

8. A composition of matter according to claim 5 in which the tetracycline antibiotic is demethyltetracycline.

9. A method of increasing the absorption of a tetracycline antibiotic in mammals which comprises orally administering to said mammals the composition of claim 1.

10. A method according to claim 9 in which the tetracycline antibiotic is tetracycline.

11. A method according to claim 9 in which the tetracycline antibiotic is demethylchlortetracycline.

12. A method according to claim 9 in which the tetracycline antibiotic is demethyltetracycline.

13. A method of increasing the absorption of a tetracycline antibiotic in mammals which comprises orally administering to said mammals the composition of claim 5.

14. A method according to claim 13 in which the tetracycline antibiotic is tetracycline.

15. A method according to claim 13 in which the tetracycline antibiotic is demethylchlortetracycline.

16. A method according to claim 13 in which the tetracycline antibiotic is demethyltetracycline.

References Cited

UNITED STATES PATENTS

| | | | |
|---|---|---|---|
| 2,805,977 | 9/1957 | Robinson | 167—82 |
| 2,951,766 | 9/1960 | White | 167—65 |
| 3,026,248 | 3/1962 | Noseworth | 167—65 |
| 3,085,933 | 4/1963 | Schooley | 167—65 |

OTHER REFERENCES

Chemical Abstracts 55: P3014i to P3015a (1961) which abstracts Czech Patent 90,938, July 15, 1959.

ALBERT T. MEYERS, *Primary Examiner.*

JULIAN S. LEVITT, *Examiner.*

JEROME D. GOLDBERG, *Assistant Examiner.*